(12) United States Patent
Cherpeck et al.

(10) Patent No.: US 8,710,147 B2
(45) Date of Patent: *Apr. 29, 2014

(54) CARBONYL-ENE FUNCTIONALIZED POLYOLEFINS

(75) Inventors: Richard E. Cherpeck, Cotati, CA (US); Ruth Smocha, San Francisco, CA (US)

(73) Assignee: Chevron Oronite Company LLC., San Ramon, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/968,546

(22) Filed: Dec. 15, 2010

(65) Prior Publication Data

US 2011/0152465 A1 Jun. 23, 2011

Related U.S. Application Data

(60) Provisional application No. 61/288,086, filed on Dec. 18, 2009.

(51) Int. Cl.
*C08F 8/00* (2006.01)
*C08F 10/10* (2006.01)
(52) U.S. Cl.
CPC .. *C08F 8/00* (2013.01); *C08F 10/10* (2013.01)
USPC .......................................... 525/154; 525/158
(58) Field of Classification Search
CPC .................................. C08F 8/00; C08F 10/10
USPC ......................................................... 525/154
See application file for complete search history.

(56) References Cited

U.S. PATENT DOCUMENTS

| | | | |
|---|---|---|---|
| 4,152,499 A * | 5/1979 | Boerzel et al. ................. | 525/381 |
| 4,163,730 A | 8/1979 | Bryant | |
| 4,832,702 A | 5/1989 | Kummer et al. | |
| 4,859,201 A | 8/1989 | Marsh | |
| 4,859,210 A | 8/1989 | Franz et al. | |
| 5,055,607 A | 10/1991 | Buckley, III | |
| 5,300,701 A | 4/1994 | Cherpeck | |
| 5,399,178 A | 3/1995 | Cherpeck | |
| 5,413,615 A | 5/1995 | Cherpeck | |
| 5,559,191 A | 9/1996 | Blackborow | |
| 5,827,344 A | 10/1998 | Fyles et al. | |
| 5,873,917 A | 2/1999 | Daly | |
| 6,039,733 A | 3/2000 | Buysse et al. | |
| 6,262,310 B1 | 7/2001 | Dever et al. | |
| 6,391,978 B1 * | 5/2002 | Peters ........................... | 525/269 |
| 6,533,830 B1 | 3/2003 | Oppenlander et al. | |
| 7,291,681 B2 | 11/2007 | Rath et al. | |
| 7,365,152 B2 * | 4/2008 | Rath et al. ..................... | 528/482 |
| 7,435,273 B2 | 10/2008 | Lange et al. | |
| 7,498,386 B2 | 3/2009 | Karl et al. | |
| 2004/0260032 A1 | 12/2004 | Irving et al. | |
| 2008/0027187 A1 * | 1/2008 | Rausa et al. ................... | 526/90 |
| 2008/0242790 A1 | 10/2008 | Leyrer et al. | |
| 2008/0274924 A1 | 11/2008 | Lange et al. | |
| 2009/0216025 A1 | 8/2009 | Jamison et al. | |
| 2010/0143651 A1 * | 6/2010 | Silvis et al. .................... | 428/141 |

FOREIGN PATENT DOCUMENTS

JP 2000169407 6/2000
WO WO2007027752 8/2007

OTHER PUBLICATIONS

Snider, B.B. "Lewis-Acid-Catalyzed Ene Reactions" Acc. Chem. Res. 1980, 13, 426-432.*
Jin, J.; Smith, D.T.; Weinreb, S.M. "Novel Intramolecular Ene Reactions of Allenylsilanes" J. Org. Chem. 1995, 60, 5366-6367.*
Ojha, U.; Rajkhowa, R.; Agnihotra, S.R.; Faust, R. "A New General Methodology for the Syntheses of End-Functional Polyisobutylenes by Nucleophilic Substitution Reactions" Macromolecules, 2008, 41, 3832-3841.*
Lewis, Richard J., Sr. (2007). Hawley's Condensed Chemical Dictionary (15th Edition).. John Wiley & Sons. Online version available at: http://www.knovel.com/web/portal/browse/display?_EXT_KNOVEL_DISPLAY_bookid=2822&VerticalID=0.*
PCT International Search Report and Written Opinion, Application No. PCT/US2010/060555 dated Sep. 23, 2011.
Biermann, Ursula and Metzger J.O., "Lewis Acid Catalyzed Additions to Unsaturated Fatty Compounds* II: Alkylaluminium Halide Catalyzed Ene Reactions of Unsaturated Fatty Compounds and Formaldehyde**", Fat Sci. Technol. 93. Jahrgang Nr. 8 1991, pp. 282-284.
Snider, Barry B., Rodini, David J., Kirk, Thomas, C., and Cordova, Robert., "Dimethylaluminum Chloride Catalyzed Ene Reactions of Aldehydes". J. Am. Chem. Soc., 1982, 104, pp. 555-563.
Mikami, Koichi, and Shimizu, Masaki., "Asymmetric Ene Reactions in Organic Synthesis". Chem. Rev., 1992, 92, pp. 1021-1050.
Behr, Arno, and Fiene, Martin., "Lewis-acid catalysed ene reaction of electrondeficient aldehydes and ketones at unsaturated fatty acid derivatives". Eur. J. Lipid Sci. Technol. 2000, 212-217.
Hoffmann, H.M.R., "The Ene Reaction". Angew. Chem. Internat. Edit., vol. 8, 1969, No. 8, pp. 556-577.
Huston, Gerri E., Dave, Apurva H., and Rawal, Viresh H., "Highly Enatioslective Carbonyl-ene Reactions Catalyzed by a Hindered Silyl-Salen-Cobalt Complex", Organic Letters, 2007, vol. 9, No. 20, pp. 3869-3872.
Jackson, Andrew C., Goldman, Boris, E., and Snider, Barry B., "Intramolecular and intermolecular Lewis Acid Catalyzed Ene Reactions Using Ketones as Enophils", J. Org. Chem., 1984, vol. 49, pp. 3988-3994.
Snider, Barry, B., "Lewis-Acid-Catalyzed Ene Reactions"., Acc. Chem. Res. 1980, 13, pp. 426-432.

* cited by examiner

*Primary Examiner* — Randy Gulakowski
*Assistant Examiner* — Christina Wales
(74) *Attorney, Agent, or Firm* — Joseph P. Foley

(57) ABSTRACT

Disclosed is a method for preparing a hydroxyl functionalized polymer from a Lewis acid promoted carbonyl-ene reaction comprising: selecting a vinylidene terminated polyolefin having a number average molecular weight from about 950 to about 5000 and having a terminal vinylidene content greater than 50 mole percent; selecting a carbonyl enophile; selecting a Lewis acid; and contacting the components in step a), b) and c) under reactive conditions to form the hydroxyl functionalized polymer.

33 Claims, No Drawings

CARBONYL-ENE FUNCTIONALIZED POLYOLEFINS

FIELD OF THE INVENTION

The present invention is directed to a method for functionalizing polyolefins with hydroxyl group(s). More particularly, the method is directed to where a vinylidene terminated polyolefin is functionalized via the carbonyl-ene reaction with a reactive aldehyde in the presence of a Lewis acid.

BACKGROUND OF THE INVENTION

Alcohols derived from polyalkanes, and more specifically, polyisobutyl alcohols have been used as carrier fluids for fuel additives and employed in fuel compositions; largely since they are relatively inexpensive to prepare, can be prepared halogen free, compatible with other additives typically employed, and by themselves may contribute some detergent action. Carrier fluids are commonly employed with fuel additives and they may serve several functions such as improving viscometrics/compatibility/mobility of the fuel additives or active ingredients and may assist in the desired functionality of the additive. Additionally, polyisobutyl alcohols have served as a precursor for the preparation of fuel additives for controlling engine deposits, as described in U.S. Pat. Nos. 5,055,607; 5,399,178; 5,413,615; 5,827,344; 6,039,733 and 4,859,210.

Typically these polyisobutyl alcohols have been prepared from polyisobutylene via hydroformulation at high temperature and high pressures (U.S. Pat. Nos. 3,429,936; 4,859,210) or via hydroboration of polyisobutene followed by oxidation (U.S. Pat. No. 5,055,607). The efficiency of the hydroformylation reaction as applied to polyisobutylene varies with the type of polymer, and conversions range from 59-81% employing the most reactive polyisobutenes (see U.S. Pat. No. 4,832,702). The polyisobutyl alcohols of the prior art are saturated compounds requiring expensive processing equipment due to the elevated temperature and pressures.

SUMMARY OF THE INVENTION

An aspect of the present invention is directed to a method for functionalizing polyolefins with hydroxyl group(s). More particularly, the method is directed to where a vinylidene terminated polyolefin is functionalized via the carbonyl-ene reaction with a reactive aldehyde in the presence of a Lewis acid. Thus, one aspect is directed to a method for preparing a hydroxyl functionalized polymer from a Lewis acid promoted carbonyl-ene reaction comprising:

a. selecting a vinylidene terminated polyolefin having a number average molecular weight from about 950 to about 5000 and having a terminal vinylidene content greater than 50 mole percent;
b. selecting a carbonyl enophile;
c. selecting a Lewis acid; and
d. contacting the components in step a), b) and c) under reactive conditions to form the hydroxyl functionalized polymer.

Suitable vinylidene terminated polyolefins are polymers or copolymers of mono-olefins, particularly 1-mono-olefins, such as ethylene, propylene, butylene, and the like. Preferably, the mono-olefin employed will have from about 2 to about 24 carbon atoms, and more preferably, from about 3 to about 12 carbon atoms. More preferred mono-olefins include propylene, butylene, particularly isobutylene. In one aspect, the vinylidene terminated polyolefin is selected from the groups consisting of polypropylene, polyisobutylene, poly-1-butene, copolymer of ethylene and isobutylene, copolymer of propylene and isobutylene, poly-1-pentene, poly-4-methyl-1-pentene, poly-1-hexene, poly-3-methylbutene-1, and polyisoprene. In a preferred aspect, the vinylidene terminated polyolefin has a number average molecular weight from about 700 to about 3,000. Particularly preferred vinylidene terminated polyolefins are derived from isobutylene.

A preferred carbonyl enophile is electron deficient containing a suitable electron withdrawing substituent that withdraws electron density either through inductive or resonance effects from the carbonyl group. In this regard, a more preferred carbonyl enophile is a reactive aldehyde of the aldehydes having the structure,

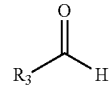

wherein $R_3$ can be hydrogen, haloalkyl, alkoxycarbonyl and aryl substituted with at least one electron withdrawing group selected from nitro, cyano, and alkoxycarbonyl.

In one aspect a reactive aldehyde is formaldehyde or paraformaldehyde. In another aspect the reactive aldehyde is selected from the group consisting of methyl glyoxylate, ethyl glyoxylate, isopropyl glyoxylate, n-butyl glyoxylate, and t-butyl glyoxylate. In a further aspect the reactive aldehyde is a benzaldehyde or substituted benzaldehyde being substituted with at least one electron withdrawing group selected from nitro, cyano and alkoxycarbonyl wherein the alkyl group is from 1 to 6 carbon atoms.

The carbony-ene reaction is promoted by a Lewis acid and the Lewis acid may be catalytic Lewis acids which are not consumed in the carbonyl-ene reaction or they may stoichiometric type Lewis acids which are consumed during the carbony-ene reaction (which is shown in Scheme 4, herein). Catalytic Lewis acids may lead to bis addition products and mixtures therein. While the stoichiometric type Lewis acids give primarily mono-addition products. Accordingly, in one aspect the Lewis acid is of the formula $R'_y AlX_{(3-y)}$ where $R'$ is a $C_{1-6}$ alkyl; X is halogen: and y is an integer from 1 to 2. Particularly preferred alkyl groups are methyl and ethyl groups. A particularly preferred halogen is chlorine. Suitable Lewis acids are selected from at least one of $Me_2AlCl$ and $EtAlCl_2$. In another aspect, the Lewis acid is a hydrocarbylsilyl halide. More particularly the hydrocarbylsilyl halide is of the formula: $R''_z SiX_{4-z}$, wherein $R''_z$ is alkyl $C_{1-6}$, aryl, X is halogen, z is an integer from 1 to 2. In one aspect $R''_z$ is alkyl $C_{1-6}$, more preferably methyl or ethyl. In another aspect, $R''_z$ is aryl. Particularly preferred compounds are $MeSiCl_3$, $Me_2SiCl_2$, $EtSiCl_3$, $Et_2SiCl_2$, $Ph-SiCl_3$ and mixtures containing one or more of these compounds (wherein Me is methyl, Et is ethyl and Ph is phenyl group).

A further aspect is directed to products produced by the methods described above.

The hydrocarbylsilyl halide compounds advantageously are non-pyrophoric and thus easier to handle in promoting the carbonyl-ene reaction. The hydrocarbylsilyl halide are not moisture sensitive and can used when water is present as an impurity or generated in the reaction. Accordingly an aspect is to a method for preparing mono addition products in a carbonyl-ene reaction comprising conducting the carbony-ene reaction with a stoichiometric amount of a hydrocarbylsilyl halide of the formula: $R''_z SiX_{4-z}$, wherein $R''_z$ is alkyl $C_{1-6}$, aryl, X is halogen, z is an integer from 1 to 2. In this regard, suitable enes are selected from alkenes having an allyic hydrogen, wherein suitable carbonyl enophiles have been described above. Thus a further aspect is directed to the use of a hydrocarbylsilyl halide as a Lewis acid. More particularly an aspect is directed to the use of a hydrocarbylsilyl halide of the formula above to promote a carbonyl-ene reaction.

DETAILED DESCRIPTION OF THE INVENTION

As used herein, the terms used have the following meaning:

As used herein, unless otherwise specified the term "alkyl" means a straight chain or branched saturated hydrocarbon moiety. "Lower alkyl" means an alkyl group having 1 to 6 carbon atoms.

As used herein, unless otherwise specified the term "halogen" means fluorine, chlorine, bromine, or iodine.

As used herein, unless otherwise specified the term "haloalkyl" refers to an alkyl radical, as defined above, that is substituted by one or more halogen radicals, as defined above, e.g., trifluoromethyl, difluoromethyl, trichloromethyl, 2,2,2-trifluoroethyl, 1-fluoromethyl-2-fluoroethyl, 3-bromo-2-fluoropropyl, 1-bromomethyl-2-bromoethyl, and the like.

As used herein, unless otherwise specified the term "acyl" means —C(O)R* where R* is hydrogen, alkyl or aryl defined herein. The term "lower acyl" refers to where R* is a lower alkyl defined above.

As used herein, unless otherwise specified the term "hydrocarbyl" means a monovalent, linear, branched or cyclic group which contains only carbon and hydrogen atoms.

As used herein, unless otherwise specified the term "carboxyl" means —COOH.

As used herein, unless otherwise specified the term "alkoxy" means —O-(alkyl), wherein alkyl is defined above.

As used herein, unless otherwise specified the term "alkoxycarbonyl" means —C(=O)-(alkyl), wherein alkyl is defined above.

As used herein, unless otherwise specified the term "alkoxy alkyl" means -(alkyl)-β-(alkyl), wherein each "alkyl" is independently an alkyl group as defined above.

As used herein, unless otherwise specified the term "aryl" means a carbocyclic aromatic ring containing from 5 to 14 ring atoms. The ring atoms of a carbocyclic aryl group are all carbon atoms, such as, phenyl, tolyl, fluorenyl, indenyl, azulenyl, and naphthyl, as well as benzo-fused carbocyclic moieties such as 5,6,7,8-tetrahydronaphthyl and the like. A carbocyclic aryl group can be unsubstituted or substituted by 1 to 3 substituents selected from halogen, carboxyl, acyl, lower acyl, carboxyl, alkoxycarbonyl, cyano and nitro.

As used herein, unless otherwise specified the term "aryloxy" means —O-aryl group, wherein aryl is as defined above. An aryloxy group can be unsubstituted or substituted.

As used herein, unless otherwise specified the term "arylalkyl" means -(alkyl)-(aryl), wherein alkyl and aryl are defined above.

As used herein, unless otherwise specified the term "arylalkyloxy" means —O-(alkyl)-(aryl), wherein alkyl and aryl are defined above.

As used herein, unless otherwise specified the term "cycloalkyl" means a monocyclic or polycyclic saturated ring comprising carbon and hydrogen atoms and having no carbon-carbon multiple bonds. A cycloalkyl group can be unsubstituted or substituted. Preferably, the cycloalkyl group is a monocyclic ring or bicyclic ring.

As used herein, unless otherwise specified the term "vinylidene terminated polyolefin" refers to a polyolefin that contains at least one vinylidene end group, examples include compounds of the following formula:

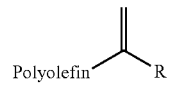

wherein R is hydrogen or hydrocarbyl.

The term "alkylvinylidene" or "alkylvinylidene isomer" refers to an olefin having the following vinylidene structure:

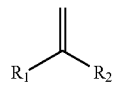

wherein $R_1$ is alkyl or substituted alkyl. $R_1$ generally has at least about 30 carbon atoms, and more preferably at least about 50 carbon atoms and $R_2$ is lower alkyl of from about 1 to about 6 carbon atoms.

As used herein, unless otherwise specified the term "catalytic amount" is recognized in the art and means a sub-stoichiometric amount relative to the reactant.

As used herein, unless otherwise specified the term "electron withdrawing group" means a functionality which draws electrons to itself more than a hydrogen atom would at the same position. Exemplary electron withdrawing groups include carbonyl groups, halogen groups, nitro groups, cyano groups and the like.

Polyolefin

Suitable vinylidene terminated polyolefins are polymers or copolymers of mono-olefins, particularly 1-mono-olefins, such as ethylene, propylene, butylene, and the like. Preferably, the mono-olefin employed will have from about 2 to about 24 carbon atoms, and more preferably, from about 3 to about 12 carbon atoms. More preferred mono-olefins include propylene, butylene, particularly isobutylene, 1-octene and 1-decene. Preferred, polyolefins prepared from such mono-olefins include polypropylene, polybutene, especially polyisobutene.

Suitable polyolefins comprise about 20 to about 400 carbon atoms. More preferably the polyolefins comprise 30 to about 360 carbon atoms and these polymers have a number average molecular weight ($M_n$) of from about 950 to about 5000 g/mol. Examples of these are oligomers of ethylene, of propylene, of butene, including isobutene, and of branched isomers of pentene, hexene, octene and of decene, the copolymerizable terminal group of the oligomer being present in the form of a vinyl, vinylidene or alkylvinylidene group, oligopropenes and oligopropene mixtures of from about 60 to about 200 carbon atoms and in particular oligoisobutenes, as obtainable, for example, according to DE-A 27 02 604, corresponding U.S. Pat. No. 4,152,499, are preferred. Mixtures of the stated oligomers are also suitable, for example, mixtures of ethylene and other alpha olefins. Other suitable polyolefins are described in U.S. Pat. No. 6,030,930 which is herein incorporated by reference. The molecular weights of the oligomers may be determined in a conventional manner by gel permeation chromatography. For the polyolefin, illustrative polymers include polypropylene, polyisobutylene, poly-1-butene, copolymer of ethylene and isobutylene, copolymer of propylene and isobutylene, poly-1-pentene, poly-4-methyl-1-pentene, poly-1-hexene, poly-3-methyl-butene-1, polyisoprene, etc.

High molecular weight olefins are generally mixtures of molecules having different molecular weights and can have at least one branch per 6 carbon atoms along the chain, preferably at least one branch per 4 carbon atoms along the chain, and particularly preferred that there be about one branch per 2 carbon atoms along the chain. These branched chain olefins may conveniently comprise polyalkenes prepared by the polymerization of olefins of from about 3 to about 6 carbon atoms, and preferably from olefins of from about 3 to about 4 carbon atoms, and more preferably from propylene or isobutylene. The addition-polymerizable olefins employed are normally 1-olefins. The branch may be from about 1 to about 4 carbon atoms, more usually of from about 1 to about 2 carbon atoms and preferably methyl.

The preferred alkylvinylidene isomer comprises a methyl- or ethylvinylidene isomer, more preferably the methylvinylidene isomer.

The especially preferred high molecular weight olefins are polyisobutenes which comprise at least about 50% and more preferably at least about 70%. Suitable polyisobutenes include those prepared using $BF_3$ catalysis. The preparation of such polyisobutenes in which the methylvinylidene isomer comprises a high percentage of the total composition is described in U.S. Pat. Nos. 4,152,499 and 4,605,808.

The polyisobutenes employed in the present invention are characterized by having a large percentage of terminal double bonds and for purposes of the present invention are referred to as reactive polyisobutene or highly reactive polyisobutene. This is in contrast to "conventional" polyisobutylene which has nonreactive chain end such as —$C(CH_3)$=$C(CH_3)$—$CH(CH_3)_2$ which do not readily undergo reaction in the carbonyl-ene reaction scheme. Conventional polyisobutene typically contains approximately 90% or greater of the internal bonds and thus are unsuitable; these internal olefins are not reactive in the scheme of the present invention. Thus, highly reactive polyisobutenes containing a high mole percentage of alkylvinylidene and 1,1-dialkyl isomers such as the methyl vinylidene isomer are employed. Typically the polyisobutenes are mixtures of polyisobutene having 32 to 360 carbon atom. The polyisobutenes mixture comprises greater than 50 mole percent of the reactive methyl vinylidene isomer, preferably greater than 70 mole percent of the reactive methyl vinylidene isomer, more preferably greater than 80 mole percent of the reactive methyl vinylidene isomer.

The polyisobutenes have a number average molecular weight in the range of about 450 to about 5000. Polyisobutenes having number average molecular weights from about 550, 1000, 1300 or 2300, and mixtures thereof, are particularly useful. The polyisobutenes are selected to have a number average molecular weight from 450 to 5,000; a preferred aspect is directed to number average molecular weights from 450 to 3,000; more particularly to a number average molecular weights from 700 to 3,000 and even more preferably having a number average molecular weight from 900 to 2,500.

The reactive polyisobutenes having a high content of olefinically unsaturated terminal groups are known in the art and typically prepared by cationic polymerization of isobutene or isobutene-containing hydrocarbon steams in the presence of boron trifluoride complex catalyses. For example suitable methods are described in U.S. Pat. Nos. 4,152,499; 5,286,823, 5,408,018; EP-A 145 235, EP-A 481 297, EP 671 419, EP-A 628 575, EP-A 807 641, WO 99/31151 and the like.

It is possible to copolymerize isobutene and to react monomer mixtures of isobutene or an isobutenic hydrocarbon mixture with olefinically unsaturated monomers which are copolymerizable with isobutene. When monomer mixtures of isobutene with suitable comonomers are to be copolymerized, the monomer mixture comprises preferably at least 5% by weight, more preferably at least 10% by weight and in particular at least 20% by weight of isobutene, and preferably at most 95% by weight, more preferably at most 90% by weight and in particular at most 80% by weight of comonomers. Useful copolymerizable monomers include vinylaromatics such as styrene and α-methylstyrene, $C_1$-$C_4$-alkylstyrenes such as 2-, 3- and 4-methylstyrene and 4-tert-butylstyrene, alkadienes such as butadiene and isoprene, and isoolefins having from 5 to 10 carbon atoms, such as 2-methylbutene-1,2-methylpentene-1,2-methylhexene-1,2-ethylpentene-1,2-ethylhexene-1 and 2-propylheptene-1. Useful comonomers are also olefins which have a silyl group, such as 1-trimethoxysilyl-ethene, 1-(trimethoxy-silyl)propene, 1-(trimethoxysilyl)-2-methylpropene-2,1-[tri(methoxyethoxy)silyl]ethene, 1-[tri(methoxyethoxy)silyl]propene, and 1-[tri(methoxyethoxy)silyl]-2-methylpropene-2, and also vinyl ethers such as tert-butyl vinyl ether. Commonly employed reactions include metal supported catalysts such as in US Pat. App. No. US2008/0293900. When copolymers are to be prepared with the process according to the invention, the process can be configured so as to form preferentially random polymers or preferentially block copolymers. To prepare block copolymers, the different monomers can, for example, be fed successively to the polymerization reaction, in which case the second monomer is added in particular only when the first comonomer has already been polymerized at least partly. In this way, diblock, triblock and also higher block copolymers are obtainable, which, depending on the sequence of monomer addition, have a block of one or another comonomer as the terminal block. In some cases, block copolymers are also formed when all comonomers are fed simultaneously to the polymerization reaction but one polymerizes significantly more rapidly than the other or the others. This is the case especially when isobutene and a vinylaromatic compound, especially styrene, are copolymerized in the process according to the invention. This preferably forms block copolymers with a terminal polyisobutene block. This is attributable to the fact that the vinylaromatic compound, especially styrene, polymerizes significantly more rapidly than isobutene.

Other suitable reactive vinylidene terminated polyolefins may be prepared by "living" polymerization or "quasi-living" polymerization of isobutene followed by suitable quenching steps. Wherein the term "quasi-living polymerization" as used herein refers to living polymerizations wherein reversible chain terminations is operable, but the rates of irreversible chain termination and chain transfer approach zero and the term "quenching agent" as used herein refers to a chemical compound which is added to a polymerization reaction to react with the polymer chain end in the presence of an active Lewis acid. The quenching agent facilitates the removal of a proton from the reactive chain end. Quasi-living polymerization is has been referred to as living polymerization and is known in the art (although true living polymerization refers to polymerizations that proceed in the absence of measurable chain transfer and chain termination) using a variety of systems, some of which are described in U.S. Pat. Nos. 5,350,819; 5,169,914; and 4,910,321. The quasi-living polymerization may be conducted as a batch process, a continuous process, a semi-batch process or by any process known by persons skilled in the art. Suitable monomers are selected from the group consisting of isobutylene, styrene, beta pinene, isoprene, butadiene, or substituted compounds of the preceding types. In some embodiments, the monomer is isobutylene, 2-methyl-1-butene, 3-methyl-1-butene, 4-methyl-1-pentene, or beta-pinene and mixtures thereof. In some embodiments, the monomer is isobutylene. In one aspect the monomer is 4-methyl-1-pentene.

The cationic quasi-living polymerization reaction is typically carried out under inert gas and in a substantially anhydrous environment. The reactor is charged with the following reactants: 1. a diluent, 2. an initiator, 3. an electron donor, or common ion salt, or its precursor, 4. one or more monomers, and 5. a Lewis acid, which typically comprises a halide of titanium or boron. The reaction mixture is equilibrated at the desired temperature, ranging from about −130° C. to about 10° C. The reaction may be carried out at any desired pressure, atmospheric, sub-atmospheric or super-atmospheric pressure. The progress of the polymerization reaction is monitored in situ by determination of the amount of monomer remaining in the reaction mixture. After high conversion of the monomer is observed, an aliquot is removed for determination of the pre-quench chain end composition before addition of the quenching agent. The polymerization reaction in the aliquot is terminated with an appropriate alcohol equilibrated at the desired temperature. Thereafter 6. One or more quenching agents are added to the reaction mixture to quench the polymerization reaction. Although, the concentration of the reactants may be varied to obtain the desired product, it has been found that certain ratios of the reactants are preferred for obtaining high exo-olefin chain end yield. The initiator for quasiliving polymerization can be mono-functional or multi-functional, depending upon the desired product, thus for example it can be indistinguishable from polyisobutene when employing 2-chloro-2,4,4-trimethyl pentane or can add other groups such as alkyl, aromatic, alkyl aromatic groups and the like. These initiator transfer agents, coined "inifers" (see U.S. Pat. Nos. 4,276,934 and 4,524,188) are retained in the polyolefin. For isobutylene it is believed that the quenching agent selectively catalyses the elimination of a proton from the gem-dimethyl carbon of the polyisobutylene carbenium ion. Suitable living or quasiliving isobutylene polymerization and systems are known, see for example U.S. Pub Nos. 2007/0155911, 2006/0041084, 2006/0041083, 2006/0041081, 2006/0041072 which further disclose various suitable quenching agents.

Typical quasi-living polyisobutene systems comprise contacting an isobutene monomer with an initiator in the presence of a Lewis Acid and solvent, under suitable quasi-living polymerization reaction conditions to obtain a quasi-living carbocationically terminated polymer which thereafter is quenched. Suitable quasi-living carbocationically terminated polymers can be formed by ionizing a polyolefin chain end, commonly halides, in the presence of a Lewis acid and a solvent under suitable quasi-living polymerization reaction conditions. This quasi-living carbocationically terminated polymer polymerization monomer is conducted with a quenching agent under suitable conditions to enable the quenching agent to interact with the reactive chain end of the polyolefin and facilitate the removal of a proton from the reactive chain end, thereby forming the methyl-vinylidene end group. Thus, selecting suitable quenching reaction system conditions (temperature, Lewis Acid, solvent) can optimize conversion to the desired vinylidene terminated polymer. Preferably, conversion is greater than 90 mole % and even up to 100 mole % when compared to a control at the same conditions in the absence of a quenching agent; and thus the polyisobutene polymer product can have a high methyl-vinylidene content. These preferred polyisobutene typically have a methyl-vinylidene content of greater than 90 mole %, preferably greater than 95 mole %, such as having at least 98 to 100 mole % with a narrow polydispersity of less than 1.4, preferably less than 1.3 to about 1.01, and more preferably about 1.1 or less. The polyisobutenes and polyisobutene containing materials are selected to have a number average molecular weight from 450 to 5,000. Another aspect is directed to number average molecular weights from 450 to 3,000; more particularly to a number average molecular weights from 700 to 3,000. Another aspect is directed to number average molecular weights are from 900 to 2,500.

Suitable vinylidene terminated polyolefins may be homopolymers, dimers and copolymers of 1-olefins and comprise from about 2 to about 40 carbon atoms, preferably from about 6 to about 30 carbon atoms, such as decene, dodecene, octadecene and mixtures of $C_{20}$-$C_{24}$-1-olefins and $C_{24}$-$C_{28}$-1-olefins, more preferably from about 10 to about 20 carbon atoms. Preferably 1-olefins, which are also known as alpha olefins, with number average molecular weights in the range 100-4,500 or more are preferred, with molecular weights in the range of 200-2,000 being more preferred. For example, alpha olefins obtained from the thermal cracking of paraffin wax. Generally, these olefins range from about 5 to about 20 carbon atoms in length. Another source of alpha olefins is the ethylene growth process which gives even number carbon olefins. Another source of olefins is by the dimerization of alpha olefins over an appropriate catalyst such as the well known Ziegler catalyst.

Other suitable polyolefins, (also referred to as high vinylidene polyolefins or alkylvinylidene polyolefins) are preferably polymers and copolymers of $C_3$-$C_{20}$ olefins or copolymers of ethylene with a $C_3$-$C_{20}$ olefin. The aforesaid high reactivity polyolefins which can be used to prepare the copolymers of the present invention also include reactive, low molecular weight, viscous, essentially 1-olefin-containing poly(1-olefins) and copoly(1-olefins) that can be prepared employing a catalyst comprising a Periodic Group IVb metallocene and an aluminoxane and/or boron containing cocatalyst from a feedstock containing one or more $C_3$ to $C_{20}$ 1-olefins. Such reactive, low molecular weight, viscous, essentially 1-olefin-containing poly(1-olefins) and copoly(1-olefins) and their method of preparation are described in U.S. Pat. No. 5,688,887 and WO 93/24539, each of which is incorporated herein by reference in its entirety. Suitable essentially terminally-unsaturated, viscous, essentially-1-olefin-containing poly(1-olefins) or copoly(1-olefins) may be made by a process which comprises polymerizing under fluid phase conditions, preferably liquid phase conditions, a feedstock comprising more than 1 weight percent of at least one volatile hydrocarbon liquid and less than 99 weight percent based on total feedstock of one or more $C_3$ to $C_{20}$-olefins using a catalyst system comprising a titanium(IV), zirconium(IV), or hafnium(IV) metallocene and an aluminoxane cocatalyst to form a poly(1-olefin) or copoly(1-olefin) having a number average molecular weight in a range from about 900 and about 5000, and most preferably about 1300 to about 3000, and terminal vinylidene content typically of more than 80%. Catalyst systems using a bis(cyclopentadienyl) or bis(indenyl) titanium(IV), zirconium(IV), or hafnium(IV) compound are preferred, particularly bis(cyclopentadienyl)-zirconium dichloride ($CP_2ZrCl_2$) or bis(indenyl) zirconium dichloride ($In_2ZrCl_2$). The resulting polymers are atactic. By essentially terminally-unsaturated is meant that preferably more than about 90%, more preferably more than about 95%, and most preferably more than about 99% of the polymer chains in the product polymer contain terminal unsaturation. The terminal unsaturation is preferably more than about 80%, more preferably more than about 90%, and most preferably more than about 95% of the vinylidene type. Such copolymers may also include copolymers of a 1-olefin and an alpha-omega diene.

Such alpha-omega dienes may include, but are not limited to, 7-methyl-1,6-octadiene. These terminally unsaturated, viscous polymers are essentially poly(1-olefins) or copoly(1-olefins). By essentially poly(1-olefins) or copoly(1-olefins) is meant more than about a 95% and, more preferably, more than about a 98% 1-olefin content in the polymer chains except where, for example, an alpha-omega diene is added as described above.

Isobutene polymers that are suitable for use as the aforesaid high reactivity polyolefin in making the copolymers of the present invention also include those described in U.S. Pat. No. 4,152,499, incorporated herein by reference in its entirety, which are obtained by polymerizing isobutene with boron trifluoride as the initiator. Cocatalysts such as water or alcohols may be used in the polymerization.

High reactivity polyolefins suitable for use in preparing the copolymers of the present invention also include terminally unsaturated ethylene alpha-olefin polymers wherein the terminal unsaturation comprises ethenylidene (i.e., vinylidene) unsaturation as disclosed in U.S. Pat. No. 4,668,834, U.S. Pat. No. 5,225,092, U.S. Pat. No. 5,225,091, U.S. Pat. No. 5,229,022, U.S. Pat. No. 5,084,534, and U.S. Pat. No. 5,324,800, the disclosures of all of which are hereby incorporated by reference in their entirety. Such polymers are polymers of ethylene and at least one alpha-olefin having the formula $H_2C=CHR'''$, wherein $R'''$ is a straight chain or branched chain alkyl radical comprising 1 to 18 carbon atoms and wherein the polymer contains a high degree of terminal ethenylidene unsaturation. Preferably $R'''$ in the above formula is alkyl of from 1 to 8 carbon atoms, and more preferably is alkyl of from 1 to 2 carbon atoms. Such alpha-olefins include propylene, 1-butene, hexene-1, octene-1,4-methylpentene-1, decene-1, dodecene-1, tridecene-1, tetradecene-1, hexadecene-1, heptadecene-1, octadecene-1, and mixtures thereof (e.g., mixtures of propylene and 1-butene, and the like). Exemplary of such polymers are ethylene-propylene copolymers, ethylene-butene-1 copolymers and the like. The molar ethylene content of the ethylene alpha-olefin polymers is preferably in the range of between about 20 and about 80 percent, and more preferably between about 30 and about 70 percent. When propylene and/or butene-1 are employed as comonomer(s) with ethylene, the ethylene content of such copolymers is most preferably between about 45 and about 65 percent, although higher or lower ethylene contents may be present.

The ethylene alpha-olefin polymers generally possess a number average molecular weight of from about 700 to about 5,000. Such ethylene alpha-olefin polymers having a number average molecular weight within the range of from about 1500 to about 3,000 are particularly useful in the present invention. Such polymers generally possess an intrinsic viscosity (as measured in tetralin at 135° C.) of between about 0.025 and about 0.9 dl/g, preferably of between about 0.05 and about 0.5 dl/g, most preferably of between about 0.075 and about 0.4 dl/g. These polymers preferably exhibit a degree of crystallinity such that, when grafted, they are essentially amorphous. These ethylene alpha-olefin polymers are further characterized in that at least about 60 percent, and most preferably at least about 75 percent (for example, 75-98%), of such polymer chains exhibit terminal ethenylidene unsaturation. The percentage of polymer chains exhibiting terminal ethenylidene unsaturation may be determined by FTIR spectroscopic analysis titration, or $C^{13}$ NMR.

The ethylene alpha-olefin polymers may be prepared as described in U.S. Pat. No. 4,668,834, U.S. Pat. No. 5,225,092, U.S. Pat. No. 5,225,091, U.S. Pat. No. 5,229,022, U.S. Pat. No. 5,324,800, U.S. Pat. No. 5,094,534, and European Patent Publications 128,045 and 129,368, the disclosures of all of which are hereby incorporated by reference in their entirety. The ethylene alpha-olefin polymers can be prepared by polymerizing monomer mixtures comprising ethylene in combination with other monomers such as alpha-olefins having from 3 to 20 carbon atoms (and preferably from 3 to 4 carbon atoms, that is, propylene, butene-1, and mixtures thereof) in the presence of a catalyst system comprising at least one metallocene (for example, a cyclopentadienyl-transition metal compound) and an alumoxane compound. The comonomer content of the ethylene alpha-olefin polymers can be controlled through the selection of the metallocene catalyst component and by controlling the partial pressure of the various monomers.

The catalysts employed in the production of the ethylene alpha-olefin polymers are organometallic coordination compounds which are cyclopentadienyl derivatives of a Group IVb metal of the Periodic Table of the Elements (56th Edition of Handbook of Chemistry and Physics, CRC Press[1975]) and include mono, di, and tricyclopentadienyls and their derivatives of the transition metals. Particularly desirable are the metallocene of a Group IVb metal such as titanium, zirconium, and hafnium. The alumoxanes employed in forming the reaction product with the metallocenes are themselves the reaction products of an aluminum trialkyl with water. In general, at least one metallocene compound is employed in the formation of the catalyst. Metallocene is a metal derivative of a cyclopentadiene. The metallocenes used to make the ethylene alpha-olefin polymers contain at least one cyclopentadiene ring. The metal is selected from the Group IVb, preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 $C_1$ to $C_5$ hydrocarbyl substituents) or other substituents, such as, for example, a trialkyl silyl substituent. The metallocene can contain one, two, or three cyclopentadienyl rings; however, two rings are preferred.

The alumoxane compounds useful in the polymerization process may be cyclic or linear. Cyclic alumoxanes may be represented by the general formula —$(R—Al—O)_n$—, while linear alumoxanes may be represented by the general formula $R(R-AL—O)_m$, $AlR_2$. In the general formula R is a $C_1$-$C_5$ alkyl group such as, for example, methyl, ethyl, propyl, butyl, and pentyl, n is an integer of from 3 to 20, and m is an integer from 1 to about 20. Preferably, R is methyl and n and m are 4-18. Generally, in the preparation of alumoxanes from, for example, aluminum trimethyl and water, a mixture of the linear and cyclic compounds is obtained. Polymerization is generally conducted at temperatures ranging between about 20 and about 300° C., preferably between about 30 and 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation. Polymerization pressures are preferably from about 10 to about 3,000 bar, and generally at a pressure within the range from about 40 bar to about 3,000 bar; and most preferably, the polymerization will be completed at a pressure within the range from about 50 bar to about 1,500 bar. The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like. In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process for preparing the polymers.

Enophile

An aspect of the invention comprises the use of a suitable enophile which comprises a carbonyl compound or carbonyl precursor. More particularly, preferred enophiles are selected from reactive i.e. electron deficient, aldehyde, where reactivity may be effected by steric and electronic effects of the enophile or by strained enophiles such as where the reaction results in the relief of steric congestion. Preferred enophiles may be described as reactive aldehydes having the structure,

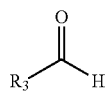

wherein $R_3$ can be hydrogen, haloalkyl, alkoxycarbonyl and aryl substituted with at least one electron withdrawing group selected from nitro, cyano, and alkoxycarbonyl.

Preferably the carbonyl compound or carbonyl precursor is an aldehyde or paraformaldehyde. A suitable aldehyde is formaldehyde which may also be in the polymerized form paraformaldehyde or trioxane. When formaldehyde is used as the enophile with a highly reactive polyisobutene as the ene, under reactive conditions with a suitable Lewis acid; the compound prepared is a w-hydroxymethyl polyisobutene compound.

In the case where $R_3$ is hydrogen, the aldehyde is formaldehyde. By formaldehyde it is meant in all its forms including gaseous, liquid and a solid and formaldehyde equivalents. Formaldehyde equivalents include but are not limited to paraformaldehyde, (polymerized formaldehyde $(CH_2O)_n$) or 1,3,5-trioxane (the cyclic trimer of formaldehyde). Formaldehyde solutions are commercially available in water and various alcohols, e.g. formalin is a 37% solution in water. Clearly aqueous solutions are is not suitable with moisture sensitive Lewis acids. Paraformaldehyde is a solid typically a powder or flaked product containing the equivalent of about 91% to 93% formaldehyde. Aqueous formalin solutions are undesirable due to the negative effects exercised by their water fraction.

Formaldehyde is generally more reactive relative to other substituted aldehydes, in that the carbon of formaldehyde is relatively more electrophilic. That is, substitution at the carbonyl by, for example, an alkyl or aryl group may stabilize the carbonyl, making it relatively less reactive than formaldehyde. However, electron withdrawing groups strategically placed on the substituent group can improve the carbonyl reactivity and lead to suitable substituted aldehydes.

Thus for example, chloral and other haloalkyl substituted aldehydes are suitably reactive to adduct with the polyisobutene in the presence of a suitable Lewis acid. Halogen substituents however, are not particularly well suited for commercial engine applications.

In a particularly preferred aldehyde, $R_3$ above is selected from an alkoxycarbonyl substituted having an alkyl group from 1 to 6 carbon atoms. These compounds can also be referred to as glyoxylate compounds of the formula:

wherein $R_4$ is alkyl from 1 to 6 carbon atoms and mixtures thereof. Preferred compounds include methyl glyoxylate, ethyl glyoxylate, isopropyl glyoxylate, n-butyl glyoxylate, and t-butyl glyoxylate. Particularly preferred is methyl glyoxylate.

Another aspect is directed to where $R_3$ is an aryl substituted with at least one electron withdrawing group selected from nitro, cyano, and alkoxycarbonyl wherein the alkyl group is from 1 to 6 carbon atoms. The aryl group may optionally be substituted with 1 to 3 substituents which do not impart significant steric hindrance or significantly negate the impact of the electron withdrawing group. In this aspect, when the aryl group is benzene, the electron withdrawing group is preferably positioned para to the carbonyl group. Thus particularly preferred compounds are substituted benzaldehydes, more preferably selected from 4-nitro benzaldehyde, 4 cyano benzaldehyde and 4-$C_{1-6}$ alkyl esters of benzaldehyde.

Screening tests may be employed to determine which aldehydes in combination with Lewis acids may be preferred for use in the present invention, including subjecting an aldehyde to the reaction conditions described herein. The carbonyl ene reaction described herein, can easily be carried out and require relatively short reaction times, allowing a wide ranges of aldehydes and Lewis acid pairs to be tested and reaction conditions optimized.

The molar ratio of ene to enophile may be 1:1 however an excess of ene moiety relative to the enophile compound improves the yields of mono adducted product from the reactions. For example ratios of between 1:1 and 10:1 and preferably 1:1 to 6:1 may be used in the present process. More particularly the molar ratio of polyisobutene to aldehyde compound may be 1:1 however an excess of polyisobutene moiety relative to the aldehyde compound improves the yields of mono adducted product from the reactions. For example ratios of between 1:1 and 10:1 and preferably 1:1 to 6:1 may be used in the present process.

Lewis Acid

Appropriate Lewis acids and reaction conditions must be chosen so that the carbonyl-ene reaction is accelerated in preference to isomerization of the methylvinylidene to less reactive trisubstituted olefins illustrated for polyisobutene (Scheme 1).

Scheme 1. Lewis Acid Catalyzed Olefin Isomerization

The Lewis acid and reaction conditions must also be chosen so that depolymerization of polyisobutene (Scheme 2) does not occur.

Scheme 2. Lewis Acid Catalyzed Depolymerization of Polyisobutene

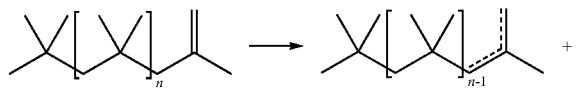

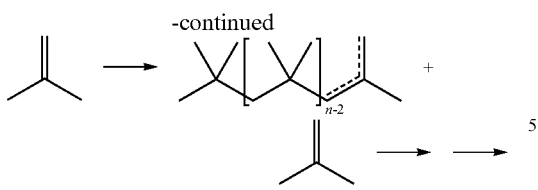

Certain Lewis acids that accomplish this can be used in a catalytic manner, others need to be used stoichiometrically. Lewis acids that can be used in a catalytic manner such as boron trifluoride or boron trifluoride complexes such as boron trifluoride etherate give both mono and bis addition of the carbonyl compound to the polyisobutene because the addition product is also an olefin. A rationalization of this is illustrated in Scheme 3 employing boron trifluoride as the Lewis acid. Mono addition products can be maximized by employing an excess of polyisobutene relative to the carbonyl compound.

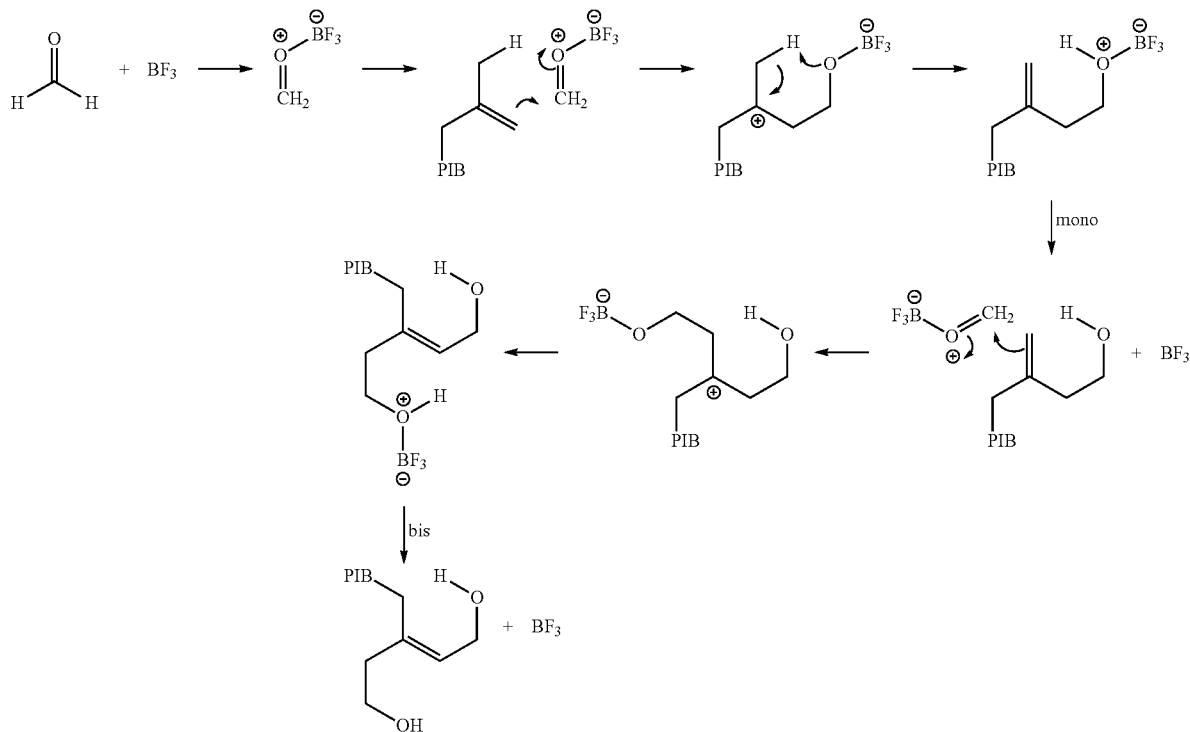

For the catalytic Lewis acids which are not consumed in the carbonyl-ene reaction; the Lewis acid is employed in catalytic quantities to produce the mono adducted polyisobutene alcohols. In general, the number of equivalents of Lewis acid per equivalent of polyisobutene will be in the range of about 0.005:1, and preferably in the range of about 0.005:0.5.

B. Snider, *Acc. Chem. Res.* 1980, 13, 426-432 (1980), has discovered that dimethylaluminum chloride and ethylaluminum dichloride Lewis acids when employed in a stoichiometric amounts give mono addition product of the carbonyl compound to olefins that are not polymeric and not subject to the side reactions that polyisobutene is susceptible to. A rationalization for this employing dimethylaluminum chloride as the Lewis acid is depicted in Scheme 4.

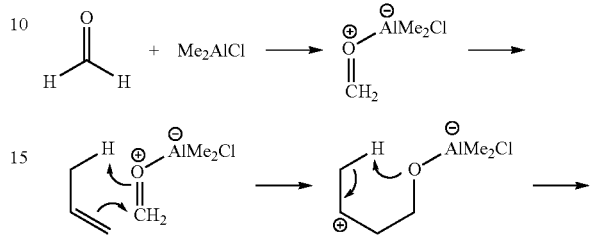

-continued

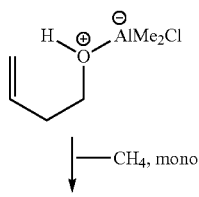

-continued

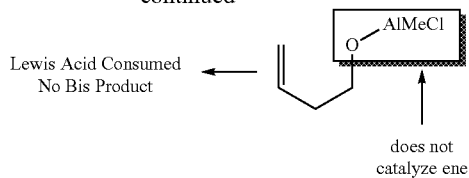

We have discovered that certain Lewis acids when used in stoichiometric quantities can give mono addition products to polyisobutene without degrading the polymer or isomerizing the olefin to the less reactive isomers. Preferred Lewis acids that can do this are alkyl-aluminum halides represented by the formula $R'_y AlX_{(3-y)}$ where R' is a $C_{1-6}$ alkyl; X is halogen: and y is an integer from 1 to 2. Particularly preferred alkyl groups are methyl and ethyl. The preferred halogen is chlorine. Particularly suited Lewis acids are $Me_2AlCl$, $EtAlCl_2$ and similar Lewis acids which do not form primary side reactions after the primary carbonyl ene reaction.

We have also discovered that another useful Lewis acid to give mono addition products when used stoichiometrically in the carbonyl-ene reaction is a hydrocarbylsilyl halide of the formula: $R''_z SiX_{4-z}$, wherein $R''_z$ is alkyl $C_{1-6}$, aryl, X is halogen, z is an integer from one to two. These hydrocarbylsilyl halides have not previously been used to catalyze the carbonyl-ene reaction. They offer advantages in not being pyrophoric and in their ease of handling.

In general for Lewis acids employed in stoichiometric amounts, the number of equivalents of Lewis acid per equivalent of polyisobutene will be in the range of about 1:10, and preferably in the range of about 1.1:2.0.

Solvent

Solvents are preferably used in the process of the present invention. The solvents are non-polar, with relatively low dielectric constants, which are selected so they do not complex preferentially to the Lewis acid. Suitable solvents include halogenated alkanes such as chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane, alkenes and halogenated alkenes (such as vinyl chloride, 1,1-dichloroethene, and 1,2-dichloroethene). Suitable solvents can include esters, such as ethyl acetate. Hydrocarbyl solvents may also be employed: such alkanes including normal alkanes such as propane, normal butane, normal pentane, normal hexane, normal heptane, normal octane, normal nonane and normal decane, and branched alkanes including isobutane, isopentane, neopentane, isohexane, 3-methylpentane, 2,2-dimethylbutane, 2,3-dimethylbutane and the like); aromatic solvents such as benzene, toluene, xylene, as the like, including halo substituted aromatic compounds such as chlorobenzene. Solvents may also include mixtures of the above and other known organic compounds used in Lewis acid catalyzed ene-reactions. Preferred solvents may include benzene, toluene, xylene, hexane, chlorobenzene, methylene chloride, chloroform, dichloromethane, and dichloroethane.

Temperature

The reaction conditions employed in the process depend upon the nature, i.e. boiling point or stability, of the solvent and reactants or products. Reaction temperatures are generally in the range −30 degrees Celsius to 60 degrees Celsius, more preferably in the range between 0 and 40 degree Celsius. The process may be effected at any suitable pressure, e.g. atmospheric, superatmospheric or reduced pressure; although where the polyisobutene, enophile, or the reaction product is volatile or gaseous at the reaction temperature, the reaction pressure should be sufficient to maintain them in the liquid state e.g. in solution. Typically, the reaction is carried out at ambient pressure or at the autogenous pressure of the reactants at the respective reaction temperature. The process of the present invention may be effected batch-wise or continuously.

The starting materials and byproducts formed by the carbonyl-ene are readily removed by chromatographic or other means known in the art.

EXAMPLES

The following examples are presented to illustrate specific embodiments and synthetic preparations; and should not be interpreted as limitations on the scope.

Example 1

Preparation of ω-Hydroxymethylpolyisobutylene with Dimethylaluminum Chloride

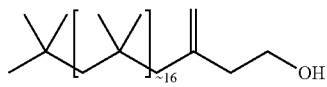

To a flask equipped with a magnetic stirrer and nitrogen inlet was added 5 grams of polyisobutylene (molecular weight 1000, 80% methylvinylidene), 136.5 milligrams of paraformaldehyde and 15 milliliters of anhydrous methylene chloride. Dimethylaluminum chloride (6.8 milliliters of a 1M solution in hexanes) was added via syringe in one portion. The reaction solution was then stirred for 16 hours at room temperature. The reaction was cooled in an ice bath and 15 milliliters of a 1% hydrochloric acid solution was added drop-wise. The resulting biphasic solution was extracted (3×15 milliliters) with hexanes. The combined organic layers were dried over magnesium sulfate, filtered and the solvent removed under vacuum to yield the crude product. The crude reaction product was purified by chromatography on silica gel eluting with hexane, followed by 10% ethyl acetate in hexane to yield 3.85 grams of the desired product as colorless oil. $^1$H-NMR (CDCl$_3$) δ: 4.95 (d, 1H), 4.85 (d, 1H), 3.70 (t, 2H), 2.35 (t, 2H), 2.00 (s, 2H), 0.90-1.50 (m, 137H).

Example 2

Preparation of ω-4-Nitrophenylhydroxymethylpolyisobutylene with Dimethylaluminum Chloride

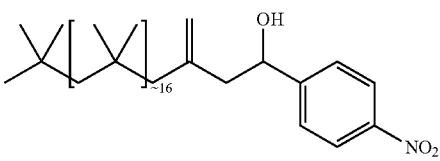

To a flask equipped with a magnetic stirrer and nitrogen inlet was added 5.35 grams of polyisobutylene (molecular weight 1000, 80% methylvinylidene), 0.74 grams of 4-nitrobenzaldehyde and 15 milliliters of anhydrous methylene chloride. Dimethylaluminum chloride (6.8 milliliters of a 1M solution in hexanes) was added via syringe in one portion. The reaction solution was then stirred for 16 hours at room temperature. The reaction was cooled in an ice bath and 15 milliliters of a 1% hydrochloric acid solution was added drop-wise. The resulting biphasic solution was extracted (3×15 milliliters) with hexanes. The combined organic layers were dried over magnesium sulfate, filtered and the solvent removed under vacuum to yield the crude product. The crude reaction product was purified by chromatography on silica gel eluting with hexane, followed by 10% ethyl acetate in hexane to yield 4.3 grams of the desired product as brown oil. $^1$H-NMR δ: 8.20 (d, 2H), 7.55 (d, 2H), 5.05 (d, 1H), 5.00 (d, 1H), 4.85 (dd, 1H), 2.50 (d, 2H), 2.05 (s, 2H), 0.80-1.50 (m, 137H).

Example 3

Preparation of ω-Hydroxymethylpolyisobutylene with Boron Trifluoride Etherate

To a flask equipped with a magnetic stirrer and nitrogen inlet was added 20 grams of polyisobutylene (molecular weight 1000, 80% methylvinylidene), 0.6 grams of paraformaldehyde and 60 milliliters of anhydrous methylene chloride. Boron trifluoride etherate (0.123 milliliters) was added via syringe in one portion. The reaction mixture was stirred for 16 hours at room temperature. The mixture was diluted with 40 milliliters of methylene chloride followed by 2 milliliters of a saturated aqueous ammonium hydroxide solution. A precipitate was filtered out. The solution was washed with saturated sodium bicarbonate followed by saturated sodium chloride solution. The methylene chloride layer was dried with anhydrous magnesium sulfate. The solvent was removed under vacuum to yield the crude product. The crude reaction product was purified by chromatography on silica gel eluting with hexane, followed by 10% ethyl acetate in hexane solution to yield 6.85 grams of the desired product.

Example 4

Preparation of ω-Hydroxymethylpolyisobutylene with Boron Trifluoride Etherate

To a flask equipped with a magnetic stirrer and nitrogen inlet was added 100 grams of polyisobutylene (molecular weight 1000, 80% methylvinylidene), 0.6 grams of paraformaldehyde and 60 milliliters of anhydrous methylene chloride. Boron trifluoride etherate (0.123 milliliters) was added via syringe in one portion. The reaction mixture was stirred for 16 hours at room temperature. The mixture was diluted with 40 milliliters of methylene chloride followed by 2 milliliters of a saturated aqueous ammonium hydroxide solution. A precipitate was filtered out. The solution was washed with saturated sodium bicarbonate followed by saturated sodium chloride solution. The methylene chloride layer was dried with anhydrous magnesium sulfate. The solvent was removed under vacuum to yield the crude product. The crude reaction product was purified by chromatography on silica gel eluting with hexane, followed by 10% ethyl acetate in hexane solution to yield 13.6 grams of the desired product.

Example 5

Preparation of ω-4-Nitrophenylhydroxymethylpolyisobutylene with Boron Trifluoride Etherate To a flask equipped with a magnetic stirrer and nitrogen inlet was added 100 grams of polyisobutylene (molecular weight 1000, 80% methylvinylidene), 3.02 grams of 4-nitrobenzaldehyde and 60 milliliters of anhydrous methylene chloride. Boron trifluoride etherate (0.123 milliliters) was added via syringe in one portion. The reaction mixture was stirred for 16 hours at room temperature. The mixture was diluted with 40 milliliters of methylene chloride followed by 2 milliliters of a saturated aqueous ammonium hydroxide solution. A precipitate was filtered out. The solution was washed with saturated sodium bicarbonate followed by saturated sodium chloride solution. The methylene chloride layer was dried with anhydrous magnesium sulfate. The solvent was removed under vacuum to yield the crude product. The crude reaction product was purified by chromatography on silica gel eluting with hexane, followed by 10% ethyl acetate in hexane solution to yield 15.2 grams of the desired product.

Example 6

Preparation of ω-Hydroxymethylpolyisobutylene with Methyltrichlorosilane

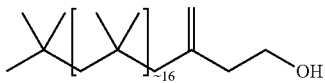

To a flask equipped with a magnetic stirrer and nitrogen inlet was added 5.35 grams of polyisobutylene (molecular weight 1000, 80% methylvinylidene), 146 milligrams of paraformaldehyde and 15 milliliters of anhydrous methylene chloride. Methyltrichlorosilane (0.86 milliliters) was added via syringe in one portion. The reaction mixture was stirred for 16 hours at room temperature. The reaction was cooled in an ice bath and 15 milliliters of a 0.5N hydrochloric acid solution was added drop-wise. The addition of the acids caused a silicon based gel to form. The methylene chloride/HCl(aq) solution was decanted from the gel and the gel is washed (3×) with a 10% ethyl acetate in hexane solution. The aqueous layer was extracted with hexanes (3×). All of the organic layers were combined, dried over magnesium sulfate, filtered and the solvent removed under vacuum to yield the crude product. The crude reaction product was purified by chromatography on silica gel eluting with hexane, followed by 10% ethyl acetate in hexane to yield 3.85 grams of the desired product as colorless oil. $^1$H-NMR (CDCl$_3$) δ: 4.95 (d, 1H), 4.85 (d, 1H), 3.70 (t, 2H), 2.35 (t, 2H), 2.00 (s, 2H), 0.90-1.50 (m, 137H).

Example 7

Preparation of ω-Hydroxymethylpolyisobutylene with Dimethyldichlorosilane

To a flask equipped with a magnetic stirrer and nitrogen inlet was added 5.06 grams of polyisobutylene (molecular weight 1000, 80% methylvinylidene), 138 milligrams of paraformaldehyde and 15 milliliters of anhydrous methylene chloride. Dimethyldichlorosilane (0.83 milliliters) was added via syringe in one portion. The reaction mixture was stirred for 16 hours at room temperature. The reaction was cooled in an ice bath and 15 milliliters of a 0.5N hydrochloric acid solution was added drop-wise. The resulting biphasic solution was extracted with hexanes (3×15 milliliters). The combined organic layers were dried over magnesium sulfate, filtered and the solvent removed under vacuum to yield the crude product. The crude reaction product was purified by chromatography on silica gel eluting with hexane, followed by 10% ethyl acetate in hexane to yield 3.0 grams of the desired product.

Example 8

Preparation of ω-Hydroxymethylpolyisobutylene with Methyltrichlorosilane

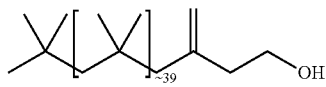

To a flask equipped with a magnetic stirrer and nitrogen inlet was added 7.26 grams of polyisobutylene (molecular weight 2300, 80% methylvinylidene), 86 milligrams of paraformaldehyde and 15 milliliters of anhydrous methylene chloride. Methyltrichlorosilane (0.51 milliliters) was added via syringe in one portion. The reaction mixture was stirred for 16 hours at room temperature. The reaction was cooled in an ice bath and 15 milliliters of a 0.5N hydrochloric acid solution was added drop-wise. The addition of the acids caused a silicon based gel to form. The methylene chloride/HCl(aq) solution was decanted from the gel and the gel is washed (3×) with a 10% ethyl acetate in hexane solution. The combined organic layers were separated and the aqueous layer extracted (3×) with hexanes. All of the organic layers were combined, dried with magnesium sulfate and the solvent removed under vacuum to yield the crude product. The reaction yielded 2.32 grams of the desired product as colorless oil.
$^1$H-NMR (CDCl$_3$) δ: 4.95 (d, 1H), 4.85 (d, 1H), 3.70 (t, 2H), 2.35 (t, 2H), 2.00 (s, 2H), 0.90-1.50 (m, 321H).

Example 9

Preparation of ω-Hydroxymethylpolyisobutylene with Phenyltrichlorosilane

To a flask equipped with a magnetic stirrer and nitrogen inlet was added 5.16 grams of polyisobutylene (molecular weight 1000, 80% methylvinylidene), 141 milligrams of paraformaldehyde and 15 milliliters of anhydrous methylene chloride. Phenyltrichlorosilane (1.1 milliliters) was added via syringe in one portion. The reaction mixture was stirred for 16 hours at room temperature. The reaction was cooled in an ice bath and 15 milliliters of a 0.5N hydrochloric acid solution was added drop-wise. The resulting biphasic solution was extracted with hexanes (3×15 milliliters). The combined organic layers were dried over magnesium sulfate, filtered and the solvent removed under vacuum to yield the crude product. The reaction yielded 2.1 grams of the desired product.

Example 10

Preparation of ω-Hydroxymethylpolyisobutylene with Methyltrichlorosilane

To a flask equipped with a magnetic stirrer and nitrogen inlet was added 5.53 grams of polyisobutylene (molecular weight 1000, 80% methylvinylidene), 151 milligrams of paraformaldehyde and 15 milliliters of anhydrous methylene chloride. Methyltrichlorosilane (2.96 milliliters) was added via syringe in one portion. The reaction mixture was stirred for 16 hours at room temperature. The reaction was cooled in an ice bath and 15 milliliters of a 0.5N hydrochloric acid solution was added drop-wise. The addition of the acids caused a silicon based gel to form. The methylene chloride/HCl(aq) solution was decanted from the gel and the gel is washed (3×) with a 10% ethyl acetate in hexane solution. The combined organic layers were separated and the aqueous layer extracted (3×) with hexanes. All of the organic layers were combined, dried with magnesium sulfate and the solvent removed under vacuum to yield the crude product. The reaction yielded 3.8 grams of the desired product as colorless oil.

Example 11

Preparation of ω-Hydroxymethylpolyisobutylene with Methyltrichlorosilane

To a flask equipped with a magnetic stirrer and nitrogen inlet was added 5.14 grams of polyisobutylene (molecular weight 1000, 80% methylvinylidene), 140 milligrams of paraformaldehyde and 15 milliliters of anhydrous methylene chloride. Methyltrichlorosilane (0.66 milliliters) was added via syringe in one portion. The reaction mixture was stirred for 16 hours at room temperature. The reaction was cooled in an ice bath and 15 milliliters of a 0.5N hydrochloric acid solution was added drop-wise. The addition of the acids caused a silicon based gel to form. The methylene chloride/HCl(aq) solution was decanted from the gel and the gel is washed (3×) with a 10% ethyl acetate in hexane solution. The combined organic layers were separated and the aqueous layer extracted (3×) with hexanes. All of the organic layers were combined, dried with magnesium sulfate and the solvent removed under vacuum to yield the crude product. The reaction yielded 3.28 grams of the desired product as colorless oil.

Example 12

Preparation of Polyisobutyl-ω-3-methylpent-2-ene-1,5-diol

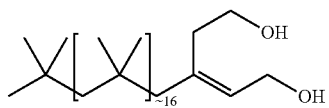

To a flask equipped with a magnetic stirrer and nitrogen inlet was added 5.3 grams of polyisobutylene (molecular weight 1000, 80% methylvinylidene), 145 milligrams of paraformaldehyde and 15 milliliters of anhydrous methylene chloride. Boron trifluoride etherate (60 microliters) was added via syringe in one portion. The reaction mixture was stirred for 16 hours at room temperature. The mixture was diluted with 10 milliliters of methylene chloride followed by 0.5 milliliters of a saturated aqueous ammonium hydroxide solution. A precipitate was filtered out. The solution was washed with saturated sodium bicarbonate followed by saturated sodium chloride solution. The methylene chloride layer was dried with anhydrous magnesium sulfate. The solvent was removed under vacuum to yield the crude product. The crude reaction product was purified by chromatography on silica gel eluting with hexane, followed by 10% ethyl acetate in hexane solution to yield 2.3 grams of predominately the di-adducted polyisobutylene. ¹H-NMR (CDCl₃) δ: 5.30 (t, 1H), 4.15 (d, 2H), 3.75 (t, 2H), 2.10 (t, 2H), 1.95 (s, 2H), 0.90-1.50 (m, 137H).

What is claimed is:

1. A method for preparing a hydroxyl functionalized polymer from a Lewis acid promoted carbonyl-ene reaction comprising:
   a. selecting a vinylidene terminated polyolefin having a number average molecular weight from about 950 to about 5000 and having a terminal vinylidene content greater than 50 mole percent;
   b. selecting a carbonyl enophile;
      wherein the carbonyl enophile is a reactive aldehyde of the formula:

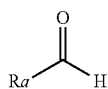

wherein Ra is selected from the group consisting of hydrogen, haloalkyl, alkoxycarbonyl and aryl substituted with at least one electron withdrawing group selected from nitro, cyano, and alkoxycarbonyl;
   c. selecting a Lewis acid; and
   d. contacting the components in step a), b) and c) under reactive conditions to form the hydroxyl functionalized polymer.

2. The method of claim 1, wherein the vinylidene terminated polyolefin is selected from the groups consisting of polypropylene, polyisobutylene, poly-1-butene, copolymer of ethylene and isobutylene, copolymer of propylene and isobutylene, poly-1-pentene, poly-4-methyl-1-pentene, poly-1-hexene, poly-3-methylbutene-1, and polyisoprene.

3. The method of claim 1, wherein the vinylidene terminated polyolefin is derived from a cationic polymerization process.

4. The method of claim 1, wherein the vinylidene terminated polyolefin is derived from a living polymerization process.

5. The method of claim 1, wherein the carbonyl enophile is electron deficient containing a suitable electron withdrawing substituent that withdraws electron density either through inductive or resonance effects from the carbonyl group.

6. The method of claim 1 wherein the reactive aldehyde is formaldehyde.

7. The method of claim 1 wherein the reactive aldehyde is selected from the group consisting of methyl glyoxylate, ethyl glyoxylate, isopropyl glyoxylate, n-butyl glyoxylate, and t-butyl glyoxylate.

8. The method of claim 1 wherein the reactive aldehyde is a benzaldehyde or substituted benzaldehyde being substituted with at least one electron withdrawing group selected from nitro, cyano and alkoxycarbonyl wherein the alkyl group is from 1 to 6 carbon atoms.

9. The method of claim 8, wherein the at least one electron withdrawing group is positioned para to the carbonyl group of the aldehyde.

10. The method of claim 1 wherein the Lewis acid is added in a stoichiometric amount to the vinylidene terminated polyolefin.

11. The method of claim 10, wherein the Lewis acid is of the formula $R'_y AlX_{(3-y)}$ where R' is a $C_{1-6}$ alkyl; X is halogen: and y is an integer from 1 to 2.

12. The method of claim 10 wherein the Lewis acid is selected from at least one of $Me_2AlCl$ and $EtAlCl_2$.

13. The method of claim 10, wherein the Lewis acid is a hydrocarbylsilyl halide of the formula: $R''_z SiX_{4-z}$, wherein $R''_z$ is alkyl $C_{1-6}$, aryl, X is halogen, z is an integer from 1 to 2.

14. The method of claim 1, wherein the Lewis acid is added in a catalytic amount and not consumed in the carbonyl ene reaction.

15. The method of claim 14, wherein the amount of Lewis acid per equivalent of vinylidene terminated polyolefin is in the range of about 0.005 to 0.5.

16. The method of claim 14 wherein a molar excess of carbonyl enophile is added in comparison to vinylidene terminated polymer.

17. A product produced according to any one of the preceding claims.

18. A method for making an alcohol-functionalized polyolefin from a Lewis acid promoted carbonyl ene reaction comprising:
   a. selecting a reactive polyisobutene having a number average molecular weight from about 1,000 to about 5000 and a methylvinylidene content greater than 50 mole percent;
   b. selecting a carbonyl enophile;
   c. selecting a Lewis acid; and
   d. contacting step a), b) and c) under reactive conditions to form the alcohol-functionalized polyolefin.

19. A method for making an alcohol-functionalized polyolefin from a Lewis acid promoted carbonyl ene reaction comprising:
   a. selecting a reactive polyisobutene having a number average molecular weight from about 700 to about 3,000 and a methylvinylidene content greater than 50 mole percent;
   b. selecting a carbonyl enophile;
   c. selecting a Lewis acid; and
   d. contacting step a), b) and c) under reactive conditions to form the alcohol-functionalized polyolefin.

20. The method of claim 18, wherein the polyisobutene is derived from the cationic polymerization of isobutene containing hydrocarbon streams using Lewis acid catalyst systems.

21. The method of claim 18, wherein the polyisobutene is derived from a living polymerization process.

22. The method of claim 18, wherein the carbonyl enophile is electron deficient containing a suitable electron withdrawing substituent that withdraws electron density either through inductive or resonance effects from the carbonyl group.

23. The method of claim 18, wherein the carbonyl enophile is a reactive aldehyde of the formula:

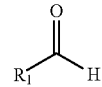

wherein $R_1$ is selected from the group consisting of hydrogen, haloalkyl, alkoxycarbonyl and aryl substituted with at least one electron withdrawing group selected from nitro, cyano, and alkoxycarbonyl.

24. The method of claim 23, wherein the reactive aldehyde is formaldehyde.

25. The method of claim 23, wherein the reactive aldehyde is selected from the group consisting of methyl glyoxylate, ethyl glyoxylate, isopropyl glyoxylate, n-butyl glyoxylate, and t-butyl glyoxylate.

26. The method of claim 23, wherein the reactive aldehyde is a benzaldehyde or substituted benzaldehyde being substituted with at least one electron withdrawing group selected from nitro, cyano and alkoxycarbonyl wherein the alkyl group is from 1 to 6 carbon atoms.

27. The method of claim 26, wherein the at least on electron withdrawing group is positioned para to the carbonyl group of the aldehyde.

28. The method of claim 18, wherein the Lewis acid is added in a stoichiometric amount to the polyisobutene.

29. The method of claim 28, wherein the Lewis acid is of the formula $R'_y AlX_{(3-y)}$ where R' is a $C_{1-6}$ alkyl; X is halogen: and y is an integer from 1 to 2.

30. The method of claim 29, wherein the Lewis acid is selected from at least one of $Me_2AlCl$ and $EtAlCl_2$.

31. The method of claim 18, wherein the Lewis acid is a hydrocarbylsilyl halide of the formula: $R''_z SiX_{4-z}$, wherein $R''_z$ is alkyl $C_{1-6}$, aryl, X is halogen, z is an integer from 1 to 2.

32. A method for preparing mono addition products in a carbonyl-ene reaction comprising conducting the carbonyl-ene reaction with a stoichiometric amount of a hydrocarbylsilyl halide of the formula: $R''_z SiX_{4-z}$, wherein $R''_z$ is alkyl $C_{1-6}$, aryl, X is halogen, z is an integer from 1 to 2.

33. A method for preparing a hydroxyl functionalized polymer from a Lewis acid promoted carbonyl-ene reaction comprising:

a. selecting a vinylidene terminated polyolefin having a number average molecular weight from about 950 to about 5000 and having a terminal vinylidene content greater than 50 mole percent;

b. selecting a carbonyl enophile;

c. selecting a Lewis acid; wherein, the Lewis acid is a hydrocarbylsilyl halide of the formula: $R''_z SiX_{4-z}$, wherein $R''_z$ is alkyl $C_{1-6}$, aryl, X is halogen, z is an integer from 1 to 2; and d. contacting the components in step a), b) and c) under reactive conditions to form the hydroxyl functionalized polymer.

* * * * *